United States Patent [19]
Shabeer et al.

[11] Patent Number: 6,134,037
[45] Date of Patent: Oct. 17, 2000

[54] REDUCTION OF INTERFEROMETER NOISE IN AN OPTICAL NETWORK

[75] Inventors: Mohammed Shabeer, Birmingham; Peter Edward Barnsley, Suffolk, both of United Kingdom; Moshe Tur, Tel Aviv, Israel; Peter Jonathon Legg, County Durham; David Kennedy Hunter, Glasgow, both of United Kingdom

[73] Assignee: British Telecommunications public limited company, London, United Kingdom

[21] Appl. No.: 08/958,736

[22] PCT Filed: May 27, 1994

[86] PCT No.: PCT/GB94/01149

§ 371 Date: Jan. 22, 1996

§ 102(e) Date: Jan. 22, 1996

[87] PCT Pub. No.: WO94/28648

PCT Pub. Date: Dec. 8, 1994

Related U.S. Application Data

[63] Continuation of application No. 08/553,342, Jan. 22, 1996.

[30] Foreign Application Priority Data

May 28, 1993 [GB] United Kingdom .................... 9311169

[51] Int. Cl.[7] ............................ H04B 10/04; H04B 10/00
[52] U.S. Cl. ......................... 359/181; 359/180; 359/181; 359/161
[58] Field of Search ..................................... 359/133, 173, 359/111, 181, 161

[56] References Cited

U.S. PATENT DOCUMENTS 5,228,043  7/1993  Naito et al. ................................ 372/32
5,508,845  4/1996  Frisken ..................................... 359/161

OTHER PUBLICATIONS

Burke et al, "128 Line Photonic Switching System Using LiNbO$_3$ Switch Matrices and Semiconductor Travelling Wave Amplifiers", J. Light Tech. 1992 10(5), pp. 610–615.
Thompson, "Architectures with Improved Signal–To–Noise Ratio in photonic Systems with Fiber–Loop Delay Lines", IEEE Journal of Selected Areas in Communications, 1988, 6(7), pp. 1096–1106.
Gimlett et al, "Effects of Phase–To–Intensity Noise Conversion by Multiple Reflections on Gigabit–per–second DFB Laser Transmission Systems", J. Light. Tech. 1989 7(6), pp. 888–895.
Padmanabhan et al, "Dilated Networks For Photonic Switching", IEEE Trans. Commun. 1987, 35(12), pp. 1357–1365.
Wood et al, "Bi–Directional Fiber–Optical Transmission Using a Multiple–Quantum Wel (MQW) Modulator/Detector", Electronic Letters 22(10), 1986.
Wood et al, "Measurement of the Effect of Optical Beat Interference on the bit Error Rate of a Sub–Carrier–Based Passive Optical Network", presented at OFC 1993, San Jose, California, 1993, paper ThM3.
Yariv et al, "Reduction of Interferometric Phase–to–Intensity conversion Noise in Fiber Links by Large Index Phase Modulation of the Optical Beam", Journal of Lightwave Technology, vol. 10, No. 7, pp. 978–981.
Hunter et al, "Architectures for Optical TDM Switching", OE/Fibers '92, SPIE Boston 1992, Paper 1787–18.

*Primary Examiner*—Jason Chan
*Assistant Examiner*—Mohammad Sedighian
*Attorney, Agent, or Firm*—Nixon & Vanderhye P.C.

[57] ABSTRACT

In an optical network through which data is transmitted as a stream of bits during successive bit periods by an optical source with a given optical center frequency, to a receiver for detecting a frequency baseband, interferometric noise power, in particular incoherent beat noise power, is minimized by causing a variation in the center frequency of the source such as to cause a redistribution of the incoherent beat noise power from the baseband to higher frequencies, thereby reducing the noise in the baseband.

20 Claims, 6 Drawing Sheets

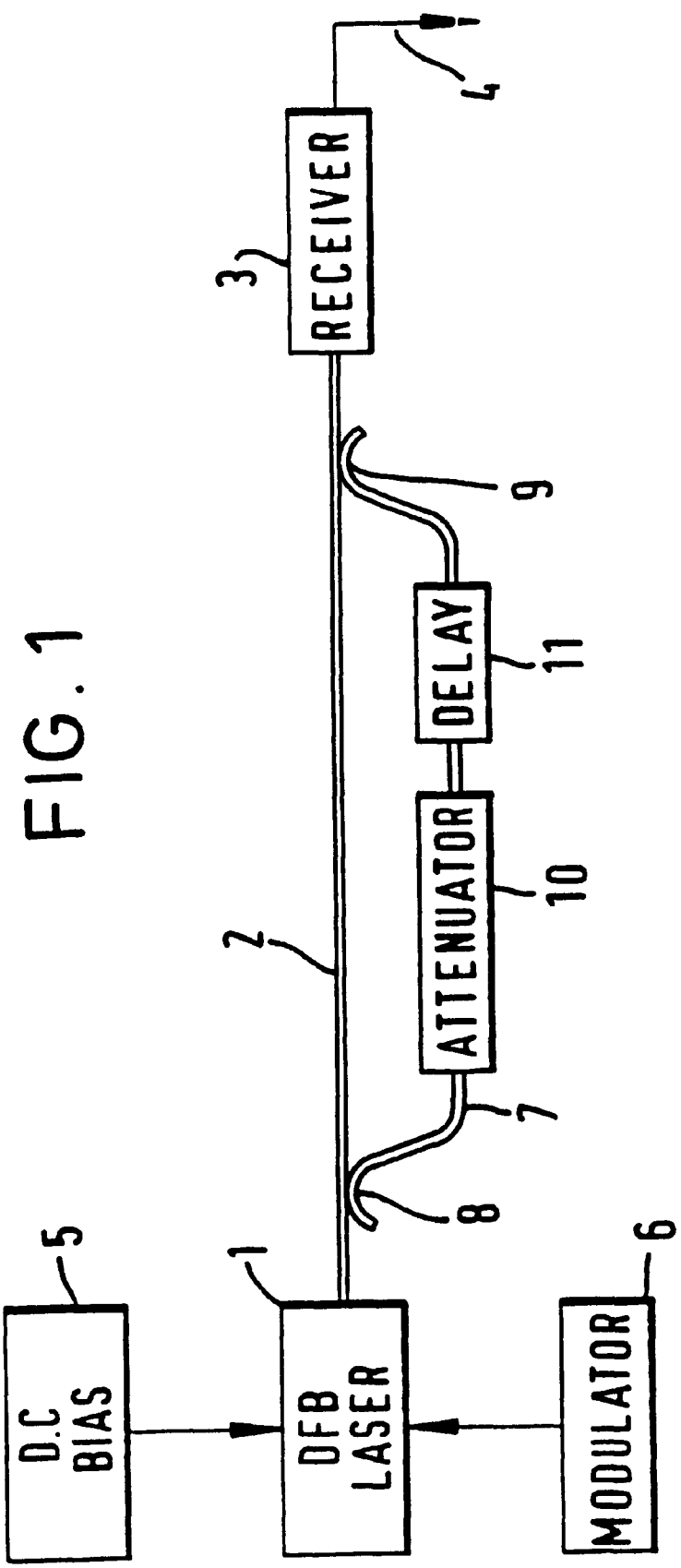

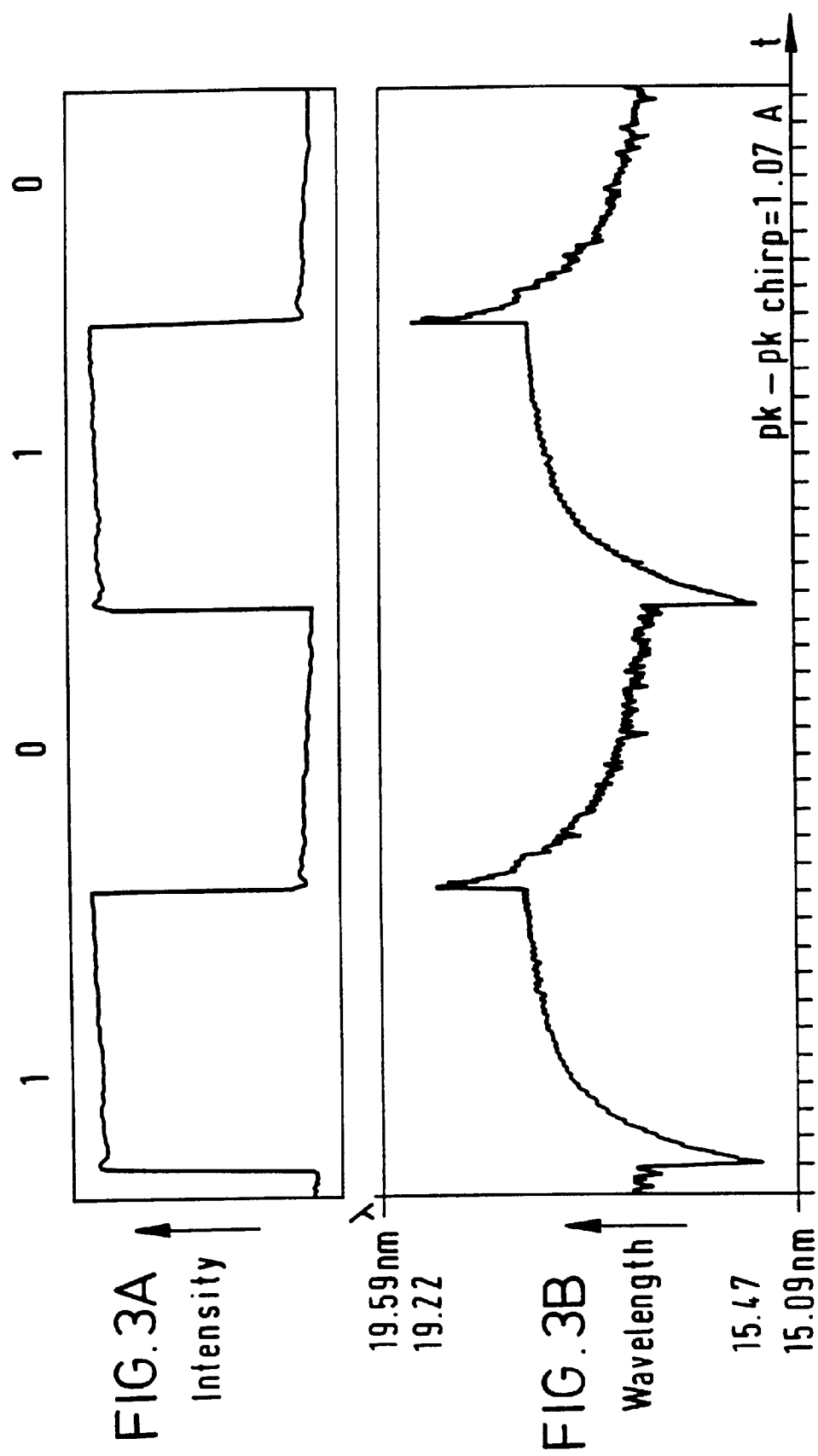

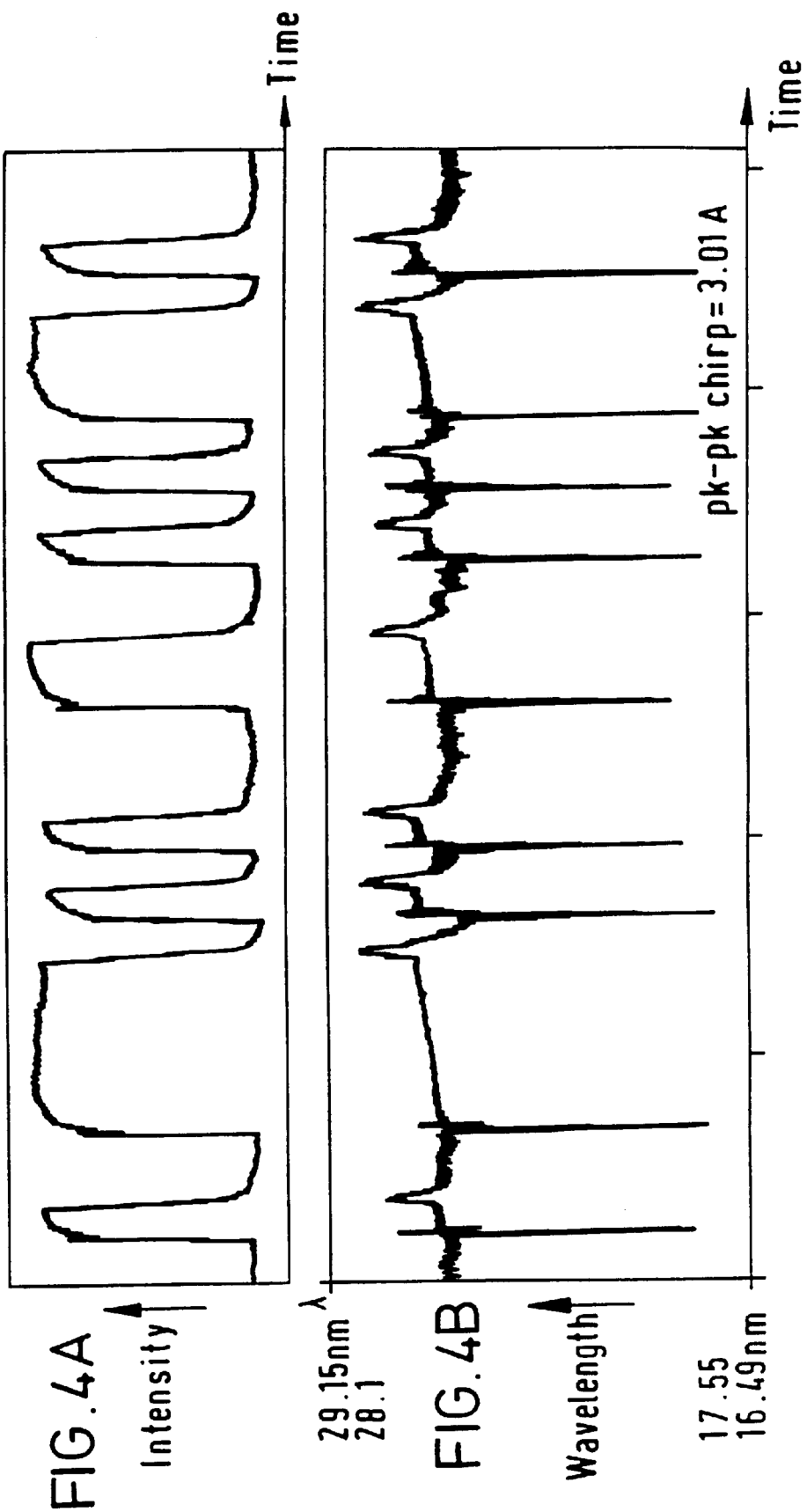

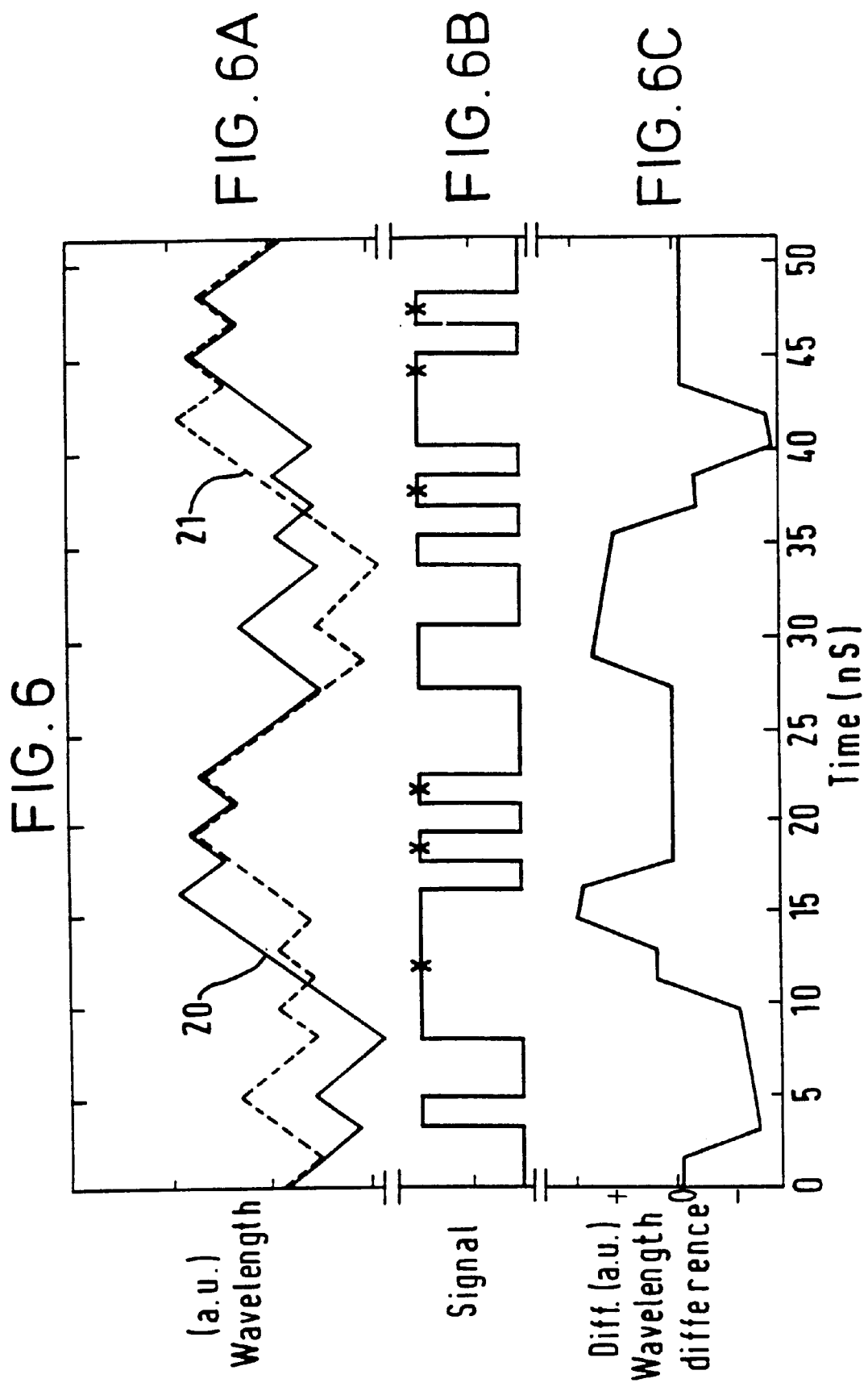

REDUCTION OF INTERFEROMETER NOISE IN AN OPTICAL NETWORK

This application is a continuation of Ser. No. 08/553,342 filed Jan. 22, 1996 which is a national stage of PCT/GB94/01149 filed May 27, 1994.

BACKGROUND OF THE INVENTION

1. Field of the Invention

This invention relates to the reduction of crosstalk in an optical network and in particular concerns the reduction of interferometric noise such as incoherent beat noise.

2. Related Art

Interferometric noise may occur when an optical wave sheds a fraction of its power, which later interferes with its parent after having experienced a temporal delay. When the temporal delay greatly exceeds the source coherence time, the interferometric noise is termed incoherent beat noise. If this condition is not met, the noise is partially coherent or coherent in nature. Several architectures in which such interference takes place have been identified, including delay elements in all-fibre optical bit rate limiters, reflections and Rayleigh backscatter in multi-stage amplified links, and crosstalk in wavelength division multiplexed (WDM) and optical time division multiplexed (OTDM) switching networks.

OTDM switching networks have been demonstrated to support high bandwidth traffic, and are additionally transparent to bit rate, coding format and wavelength. They may be configured to switch continuous high bit rate services such as high definition television (HDTV) or bursty traffic in asynchronous transfer mode (ATM) cells. OTDM switching networks employing amplitude shift keying (ASK) digital transmission/direct detection may be constructed from 2×2 switching elements interlinked by optical fibre delay lines (see the specification of PCT/GB92/00400). Inter-channel crosstalk arises in such networks because, in practice, the crosspoints do not possess perfectly isolated outputs. Every TDM channel emerging from the network is corrupted by the unwanted crosstalk waveforms.

In dealing with such unwanted crosstalk, known systems have concentrated on minimising incoherent noise-free crosstalk. The degradation resulting from this crosstalk may be modelled by a "sum of intensities" approach.

SUMMARY OF THE INVENTION

In accordance with the invention, it has been appreciated that interferometric noise, in particular incoherent beat noise crosstalk, can be more significant than incoherent noise-free crosstalk. Incoherent beat noise crosstalk is intensity noise arising from the interference of incoherent waveforms which originate either from very closely-matched wavelength sources such that their beat frequency falls within the receiver bandwidth, or from a single source with a differential delay in the optical network. Incoherent beat noise has been found to induce larger power penalties and bit error rate (BER) floors. The magnitude of the performance degradation induced is dependent upon the crosspoint isolation and the size and configuration of the network. It has been found, however that an isolation of −15 dB, limits the network size to three or four crosspoints, and this is a severe limitation when considering the design of switching networks.

In accordance with the present invention, it has been appreciated that interferometric noise, and in particular incoherent beat noise power arising when crosstalk and data originate from the same source, can be reduced in the optical network by varying the centre frequency of the source.

More particularly, in accordance with the invention there is provided a method of reducing interferometric noise power in an optical network through which data is transmitted as a stream of bits during successive bit periods by an optical source with a given centre frequency, to a receiver for receiving a frequency base band, comprising causing a variation in the centre frequency of the source such as to cause a redistribution of the interferometric noise power from the base band to higher frequencies, thereby reducing noise in the base band.

The method of the invention has particular application to the reduction of incoherent beat noise power.

The source conveniently comprises a laser diode and it has been found that according to the invention the centre frequency can be controlled by controlling the duration of periods when the laser is switched on. For a laser diode, it has been discovered that the centre frequency decreases during periods when the laser is switched on and increases during periods when the laser is switched off. This is likely to be due to heating of the laser chip, although other possible phenomena cannot be ruled out.

The network presents both a main signal path and, because of unwanted crosstalk, a subsidiary attenuated delayed signal path for the data transmitted to the receiver so that laser radiation from the main path that occurs during a given bit period suffers interference from laser radiation delayed from a preceding period. By producing the aforesaid rise and fall in frequency, the frequency difference between the interfering signals can be maximised, which causes a redistribution of the incoherent beat noise power from the base band to higher frequencies, which reduces the in-band noise.

Furthermore, the data may be coded so as to maximise the frequency difference between the centre frequencies for the interfering bit periods for which the laser is switched on.

The invention also extends to a network with reduced incoherent beat noise power, including an optical source with a given centre frequency operative to transmit data through the network as a stream of bits during successive bit periods; a receiver for detecting a frequency base band; and means for causing a variation in the centre frequency of the source such as to cause a redistribution of the incoherent beat noise power from the base band to higher frequencies, thereby reducing noise in the base band.

BRIEF DESCRIPTION OF THE DRAWINGS

In order that the invention may be more fully understood an embodiment thereof will now be described by way of example with reference to the accompanying drawings in which:

FIG. 1 is a schematic illustration of an experimental apparatus, which lead to the invention;

FIG. 3A is a graph illustrating the optical output of the laser for a relatively low bit rate (9.72 Mbit/s);

FIG. 3B is a graph illustrating the variation in laser centre wavelength that occurs for the bit pattern shown in FIG. 3A;

FIG. 4A is a graph showing a relatively high bit rate (622 Mbit/s) optical output from the laser;

FIG. 4B illustrates the variation of the centre frequency of the laser for the output signal shown in FIG. 4A;

FIG. 6A illustrates as a solid line the modelled output centre frequency of the laser shown in FIG. 5 as a function of position within the bit sequence, and a corresponding 16 bit delayed signal, which produces interference, is shown in hatched outline;

FIG. 6B illustrates the transmitted bit sequence; and

FIG. 6C illustrates the difference between the laser frequency and the frequency of the bit of the same sequence delayed by 16 bits (i.e. the frequency difference between the solid and hatched lines of FIG. 6A).

DETAILED DESCRIPTION OF EXEMPLARY EMBODIMENTS

Figure 2A:
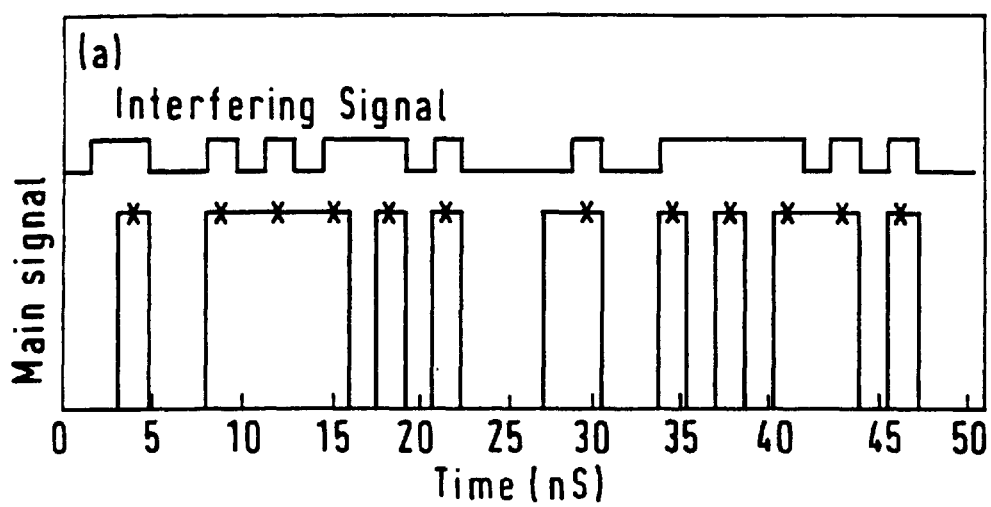
FIG. 2A is a graph of a 32 bit test pattern used in the apparatus of FIG. 1, together with an interfering copy delayed by 16 bits and the x's show positions where interferometric noise is expected.

Referring firstly to FIG. 1, this shows an experimental set-up which was used to model the characteristics of an optical switching network (or any other optical network in which incoherent beat noise crosstalk occurs). Light from a laser diode 1 is launched into an optical fibre 2 to a receiver 3 such as a photodiode that produces an electrical output 4. The laser diode, in a conventional manner, is supplied with a dc bias from a source 5. In addition, the laser diode is directly modulated by a modulator 6, resulting in the optical output as shown in the lower graph of FIG. 2A. In this example, a 32 bit test pattern was generated at 622 Mbit/s. The wavelength of the laser is typically of the order of 1538 nm.

Figure 2B:
FIG. 2B illustrates the signal at the output, exhibiting interferometric noise, with a receiver bandwidth of 2 GHz.
Figure 2C:
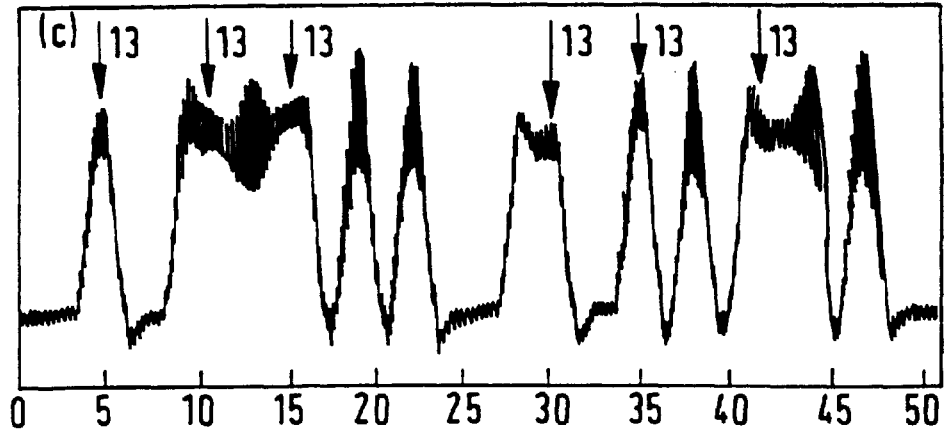
FIG. 2C illustrates the output when the receiver has a bandwidth of 615 MHz matched to that of the data transmission.

In a switching network, a plurality of switching elements are usually connected together in a matrix. In theory, a single optical path is provided for a particular signal but in practice, crosstalk occurs between the various channels, resulting in the simultaneous existence of signal and delayed crosstalk waveforms that result from multiple paths to a particular receiver. In FIG. 1 this is simulated by a second optical fibre 7 that is coupled to the fibre 2 at positions 8, 9 in a manner known per se. An attenuator 10 together with a delay 11 are connected in the path of fibre 7 and typically, a 16 bit delay occurs for signals passing through the fibre 7. Thus, at the junction 9, the main signal travelling on fibre 2 suffers interference from an attenuated signal delayed by 16 bit periods, which simulates crosstalk in a switching matrix. This interfering signal is shown in the upper part of FIG. 2A. The output of the receiver 3 is shown FIG. 2B and it will be seen that the interfering signals produce incoherent beat noise crosstalk 12 in the output signals. The output shown in FIG. 2B illustrates the full bandwidth response of the receiver(2.0 GHz). If however the receiver 3 is tuned so as to have a narrower bandwidth, corresponding to the baseband of the data, it is found that the incoherent beat noise crosstalk is reduced, as shown in FIG. 2C. Arrows 13 indicate the positions at which the incoherent beat noise crosstalk is reduced as compared with the graph of FIG. 2B. Thus, it can be seen that at the position of arrows 13, there is an effect which causes the incoherent beat noise to redistribute its frequency spectrum outside of the base band of the receiver 3. The present invention makes use of this effect in order to minimise incoherent beat noise crosstalk. It has been found that the redistribution mechanism is related to the modulation sequence applied to the laser 1.

This was investigated by measuring the centre wavelength of the modulated optical waveform produced by the laser 1, for different data bit rates. The centre wavelength was monitored using a scanning Fabry-Perot etalon (not shown).

Referring to FIG. 3A, when the modulator 6 was operated to produce a relatively low optical bit rate of 9.72 MBit/s it was found that the centre wavelength of the laser 1 varied with time as shown in FIG. 3B. It is postulated that the centre wavelength of the laser 1 is a function of its operating temperature and the device is subject to heating during the "on" periods of modulation. Thus, during the "one" bit period shown in FIG. 3A, the modulating signal from modulator 6 heats the laser and causes a progressive decrease of its operating frequency (with a corresponding increase in wavelength). Conversely, during a "zero" period of the bit waveform, in the absence of the modulating signal, the laser 1 cools with a corresponding increase in its operating centre frequency. Thus, the operating frequency cyclicly increases and decreases for successive "zero" and "one" bits, following a RC circuit like dependence with time. For the device under test, it was found that the 1/e time constant was equal to 22.5 ns.

Referring now to FIG. 4A. This shows the optical output when the relatively high bit rate 622 Mbit/s modulation is applied to the laser 1. The variation in wavelength of the optical output is shown in FIG. 4B. The relatively high modulation frequency is significantly greater than the reciprocal of the thermal time constant of the laser and as a result, there is a relatively small change (c.f. FIG. 3B) in the operating wavelength of the laser with time, from bit period to bit period. There is a sharp frequency transition between next adjacent zero and one bits, commonly called transient chirp, but this is not significant for the present analysis.

In accordance with the present invention, it has been appreciated that the dependence of the optical centre frequency of the laser on the bit rate can be used to maximise the redistribution of the incoherent beat noise power to frequencies outside of the base band of the receiver 3, thereby to reduce the in-band content. For a given data transmission bit rate, the optimum thermal time constant for the laser can be determined. The laser source should be chosen so that its time constant aligns as closely as possible with the optimum value. In this way, it is possible to maximise the frequency difference between the centre optical frequency that occurs during a particular "one" bit period, and that which occurs for the interfering delayed signal (in this example, a 16 bit period delayed signal). The frequency difference results in a redistribution of the incoherent beat noise power to higher frequencies outside of the base band of the receiver 3.

A simple example of a switching network which optimises filtering of incoherent beat noise power in this way, will now be described with reference to FIG. 5 which is based on the network shown in FIG. 13 of PCT/GB92/00400. The switching matrix consists of a plurality of 2×2 crossbar switching elements S1,1 . . . S1,7;S2,1 . . . S2,7 arranged in first and second rows R1,R2.The network allows optical signals that comprise bit trains in successive time slots applied to inputs I1,I2 to be selectively switched, reordered in terms of time slot and directed to outputs O1,O2 selectively. Thus, for example, considering switch S1,1 the input to I1 can be switched to an input of either switch S1,2 or S2,2 of row R1 or R2. Conversely, switches S1,6 and S2,6 can switch signals back between the rows R1 and R2. Successive switches in each row are connected by a direct optical fibre connection with a relatively short delay time e.g. connection C1, and also by a connection which incorporates a longer delay e.g. connection C2, in such a manner to enable signals from different time slots to be reordered in time. Reference is directed to PCT/GB92/00400 for a fuller explanation.

Figure 5:
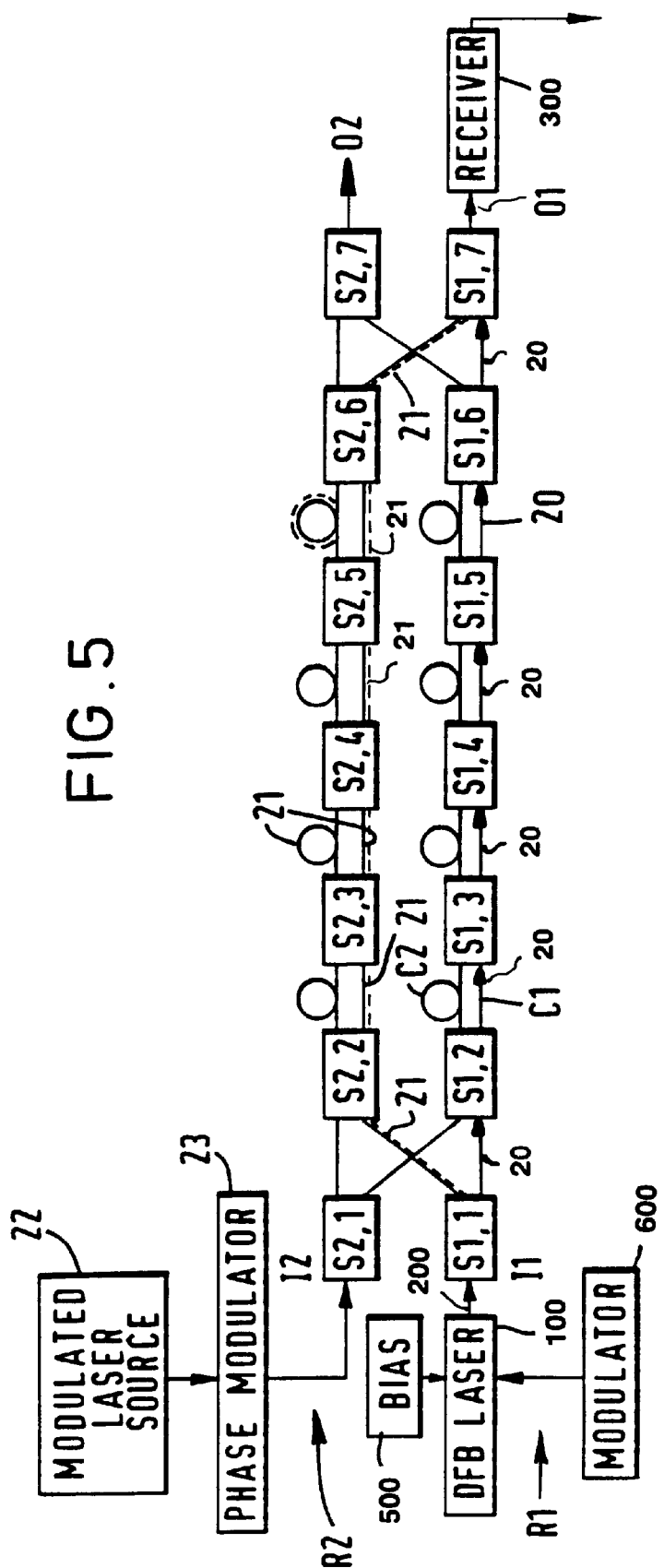
FIG. 5 illustrates schematically an optical network that operates in accordance with the invention.

In FIG. 5, a DFB laser 100 feeds an optical bit stream to an optical fibre 200 that is connected to input I1 of the switching matrix S1. Output O1 is connected to a receiver 300, typically a photodiode and associated low pass filter tuned to the baseband of the data bit stream.

Considering now the bit stream produced by laser 100, when it is desired to switch the bit stream to the receiver 300, the switching elements S1,1 ... S1,7 are set so as to provide a main, straight-through path for the signals, as illustrated by arrows 20. Additionally, due to the fact that the crossovers do not provide complete isolation between the various channels, crosstalk occurs, which is illustrated schematically by a second, longer path indicated by hatched line 21 between the laser 100 and the receiver 300. Thus, a delayed, attenuated version of the bit stream additionally reaches the receiver 300, which interferes with the signals in the main signal path 20.

In order to produce the modulated bit stream, the laser 100 is biased by a source 500, and is direct modulated by means of modulator 600 in the same way as described with reference to FIG. 100. In accordance with the invention, the laser 1 is selected to have a thermal time constant which will optimise suppression of incoherent beat noise power for the bit rate that is specified for transmission through the system, with the result that incoherent beat noise power in the baseband signal received by receiver 300 is minimised. For a given data transmission bit rate, the optimum thermal time constant for the laser can be determined. The laser source should be chosen so that its time constant aligns as closely as possible with the optimum value. In this way, it is possible to maximise the frequency difference between the centre optical frequency that occurs during a particular "one" bit period, and that which occurs for the interfering delayed signal (in this example, a 16 bit period delayed signal). The frequency difference results in a redistribution of the incoherent beat noise power to higher frequencies outside of the base band of the receiver 300.

The receiver 300 is tuned to have a bandwidth closely corresponding to the data baseband so that the incoherent beat noise power that is shifted to higher frequencies, is not detected and hence a reduction in noise occurs in the signals detected by the receiver.

In an experiment, six DFB laser chips constructed both from bulk and multiple quantum well (MQW) material of both ridge and buried heterostructure configuration, and mounted both p-side up and p-side down, were investigated in respect of the dependence of the laser thermal parameters on the laser construction. Although all the lasers demonstrated the RC like frequency change as a function of bit period, the thermal parameters were most favourable in a laser constructed as a p-side up buried heterostructure DFB. The time constant was approximately 35 ns in all cases. Generally, the p-side up mounted lasers showed a greater frequency change than their p-side down counterparts.

The laser source should be driven with a large modulation depth—this maximises the temperature difference between zero and one bits, and, additionally, maximises the temperature difference between the interfering one bits. In order words the laser should be biased at or below threshold. In networks which are limited by dispersion in addition to interferometric noise, a compromise between biasing above threshold, to damp relaxation oscillations of transient chirp, and maintaining a large modulation depth must be found.

Referring again to FIG. 5, an alternative method of inducing a time variation in the optical frequencies of the bits is to use a phase modulator. This is shown by way of example connected to the second input I2 of the switching network. A bit modulated optical signal stream from a laser source 22 illustrated schematically, is fed through a phase modulator 23, external to the laser source 22 to impart frequency variations between the interfering "one" bits.

An example of the waveforms produced in FIG. 2 will now be described with reference to FIG. 6. Referring to FIG. 6A, this shows the calculated frequency variation for the centre frequency of the laser, in response to a modulated bit stream as shown in FIG. 6B. Mathematically, the sequence dependence of the noise may be understood by considering the modulation history of the laser chip and its affect on the laser frequency. As far as the laser frequency is concerned, the laser was modelled by a linear first order system whose input and output are respectively the laser drive current and the laser optical frequency. The linear system itself is assumed to be made of a 'capacitance' shunted by a 'resistance' and is described by the following equation:

$$\text{input current} \propto C\left(\frac{df}{dt} + \frac{f}{RC}\right)$$

where f is the optical frequency

C is the 'capacitance'

R is the 'resistance' t is the time

The solid line in FIG. 6A corresponds to the signal stream 20 for the straight-through signal path, whereas the dashed line corresponds to the crosstalk signal 21. In this example, the crosstalk signal is delayed by 16 bit periods. FIG. 6C shows the wavelength difference between the two signals shown in FIG. 6A. The stars in FIG. 6B show positions at which incoherent beat noise power is to be expected within the baseband defined by the bandwidth of the receiver; however, it can be seen that, as compared with FIG. 2A, the incoherent beat noise power has been distributed out of band for the majority of bit periods in the bit stream by means of the invention, thereby producing a significant reduction in noise.

From the foregoing it will be understood that if for a given bit period, the coherence time of the optical source is reduced, the incoherent beat noise power is redistributed from the baseband to higher frequencies, thereby reducing the in-band content.

Another approach to exploit the phenomena, is to suitably code the transmitted data. For example, the number of consecutive ones or zeros in the transmitted bit stream can be limited to a predetermined number below which the resulting heating effect produces a saturation temperature. Alternatively, the data bits may be encoded into longer sequences.

What is claimed is:

1. A method of reducing interferometric noise in an optical network, said method comprising the steps of:

transmitting a stream of bits through the network during successive bit periods using an optical source with a given centre frequency, detecting a frequency baseband at a receiver, causing a variation in the centre frequency of the source with time to cause a redistribution of the noise power from the baseband to higher frequencies, thereby reducing the noise in the baseband, the centre frequency being caused to change progressively in a substantially unidirectional manner in a predetermined direction for the duration of each bit period containing a data bit of one predetermined value.

2. A method as in claim 1 wherein the interferometric noise comprises incoherent beat noise.

3. A method as in claim 1 wherein:
the centre frequency is caused to change progressively in a substantially unidirectional manner in a first direction for the duration of each bit period containing a data bit of a first value, and to change in a second opposite direction for the duration of each bit period containing a data bit of a second, different, value.

4. A method as in claim 1 wherein the optical source comprises a laser, and the bit values are defined by modulating the laser.

5. A method of reducing interferometric noise in an optical network through which data is transmitted as a stream of bits during successive bit periods by an optical source with a given centre frequency, to a receiver for detecting a frequency baseband, said method comprising:
causing a variation in the centre frequency of the source with time such as to cause a redistribution of the noise power from the baseband to higher frfequencies, thereby reducing the noise in the baseband;
the centre frequency being caused to change progressively ina substantially unidirectional manner in a predetermined direction for the duration of bit periods when the data bits are of a predetermined value;
wherein the source comprises a laser, and the bits are defined by modulating the laser; and
wherein the frequency of the laser progressively changes in a first direction for bit periods when the intensity of the laser is modulated to be at a relatively high intensity, and the centre frequency changes in a second opposite direction during periods when the intensity of the laser is modulated to be at a relatively low intensity.

6. A method as in claim 4 wherein the modulation is carried out by switching the laser on and off, and the frequency of the laser decreases during periods when the laser is operative.

7. A method of reducing interferometric noise in an optical network through which data is transmitted as a stream of bits during successive bit periods by an optical source with a given centre frequency, to a receiver for detecting a frequency baseband, said method comprising:
causing a variation in the centre frequency of the source with time such as to cause a redistribution of the noise power from the baseband to higher frfequencies, thereby reducing the noise in the baseband;
the centre frequency being caused to change progressively in a substantially unidirectional manner in a predetermined direction for the duration of bit periods when the data bits are of a predetermined value;
wherein the network presents a main signal path and a subsidiary attenuated delayed signal path for the data transmitted to the receiver, whereby optical radiation from the main path that occurs during a given bit period suffers interference from radiation delayed from a preceding bit period, and the data is coded so as to maximise the frequency difference between the centre frequencies for the interfering bit periods.

8. An optical network with reduced crosstalk, said network including:
an optical source with a given centre frequency operative to transmit data through the network as a stream of bits during successive bit periods;
a receiver for detecting a frequency baseband; and
means for causing a variation in the centre frequency of the source such as to cause a redistribution of the interferometric noise power from the baseband to higher frequencies, thereby reducing the noise in the baeband, the centre frequency being caused to change progressively in a substantially unidirectional manner in a predetermined direction for the duration of each bit period containing a data bit of one predetermined value.

9. A network as in claim 8 wherien said interferometric noise power comprises incoherent beat noise power.

10. A network as in claim 8 wherein the centre frequency changes progressively in a substantially unidirectional manner ina first direction for the duration of each bit period containing a data bit of a first value, and changes progressively in a second opposite direction for the duration of each bit period containing a data bit of a second, different, value.

11. A network as in claim 8, wherein the source comprises a laser and modulating means for the laser.

12. An optical network with reduced crosstalk, said network including:
an optical source with a given centre frequency operative to transmit data through the network as a stream of bits during successive bit periods;
a receiver for detecting a frequency baseband; and
means for causing a variation in the centre frequency of the source such as to cause a redistribution of the interferometric noise power from the baseband to higher frequencies, thereby reducing the noise in the baseband, the centre frequency being caused to change progressively in a substantially unidirectional manner in a predetermined direction for the duration of bit periods when the data bits are of a predetermined value;
said source including a laser and modulating means for the laser; and
wherein the frequency of the laser progressively changes in a first direction for bit periods when the intensity of the laser is modulated to be at a relatively high intensity, and the centre frequency changes in a second opposite direction during periods when the intensity of the laser is modulated to be at a relatively low intensity.

13. A network as in claim 11 wherein the modulator means comprises means for switching the laser on and off, and the centre frequency of the laser decreaes during periods when the laser is operative.

14. An optical network with reduced crosstalk, said network including:
an optical source with a given centre frequency operative to transmit data through the network as a stream of bits during successive bit periods;
a receiver for detecting a frequency baseband; and
means for causing a variation in the centre frequency of the source such as to cause a redistribution of the interferometric noise power from the baseband to higher frequencies, thereby reducing the noise in the baseband, the centre frequency being caused to change progressively in a substantially unidirectional manner in a predetermined direction for the duration of bit periods when the data bits are of a predetermined value;
wherein a main signal path and a subsidiary attenuated delayed signal path are presented to the data transmitted to the receiver, whereby optical radiation from the main path that occurs during a given bit period suffers interference from radiation delayed from a preceding bit period, and including coding means for coding the data so as to maximise the frequency difference between the centre frequencies for the interfering bit periods.

15. A network as in claim 8 wherein the receiver includes a photodetector and filtering means with a bandwidth corresponding to said baseband.

16. A network as in claim 8 wherein said frequency varying means comprises a frequency modulator for modifying the frequency of signals from the optical source.

17. A method of reducing interferometric noise in an optical digital signal network, said method comprising the steps of:

modulating a coherent optical carrier signal source with discrete intensity changes to generate respective digital bit-values during a sequence of successive bit periods; and progressively changing the carrier signal center frequency in a substantially unidirectional manner between said discrete intensity changes, the direction of said progressive change being a function of the digital bit-value being modulated onto said carrier signal so as to cause a frequency redistribution of interferometric noise towards higher frequencies.

18. A method as in claim 17 wherein said progressively changing step is achieved by coordinating a given data transmission bit rate with a time constant of a laser in the optical carrier signal source associated with a progressive shift in optical carrier signal center frequency, as a function of time, when intensity modulated from one level to another.

19. A method as in claim 18 wherein said time constant is a thermal time constant.

20. A method as in claim 17 wherein said progressively changing step is achieved by imposing additional phase modulation onto said coherent optical carrier signal source, said phase modulation varying synchronously with the intensity modulation so as to impart increased frequency variations between interferring bit periods.

* * * * *